US 8,380,739 B2

(12) United States Patent
O'Rourke, III (10) Patent No.: US 8,380,739 B2
(45) Date of Patent: Feb. 19, 2013

(54) SHAREABILITY UTILITY

(76) Inventor: Charles S. O'Rourke, III, Virginia Beach, VA (US)

( * ) Notice: Subject to any disclaimer, the term of this patent is extended or adjusted under 35 U.S.C. 154(b) by 1575 days.

(21) Appl. No.: 11/235,958

(22) Filed: Sep. 27, 2005

(65) Prior Publication Data
US 2006/0069701 A1    Mar. 30, 2006

Related U.S. Application Data (60) Provisional application No. 60/614,448, filed on Sep. 29, 2004.

(51) Int. Cl.
  *G06F 7/00*   (2006.01)
  *G06F 17/30*  (2006.01)
(52) U.S. Cl. ......................... 707/771; 707/783
(58) Field of Classification Search .......... None
  See application file for complete search history.

(56) References Cited

U.S. PATENT DOCUMENTS

| | | | |
|---|---|---|---|
| 6,523,022 B1 * | 2/2003 | Hobbs ............... | 707/3 |
| 7,275,063 B2 * | 9/2007 | Horn ............... | 707/102 |
| 2002/0059201 A1 * | 5/2002 | Work ............... | 707/3 |
| 2002/0169771 A1 * | 11/2002 | Melmon et al. ........... | 707/5 |
| 2005/0086188 A1 * | 4/2005 | Hillis et al. ........... | 706/50 |
| 2005/0193029 A1 * | 9/2005 | Rom et al. ............ | 707/200 |
| 2006/0242133 A1 * | 10/2006 | Denny et al. ........... | 707/3 |
| 2008/0091686 A1 * | 4/2008 | Beard ............... | 707/10 |

* cited by examiner

*Primary Examiner* — Cheryl Lewis
*Assistant Examiner* — Raheem Hoffler
(74) *Attorney, Agent, or Firm* — Kelly J. Hollowell (57) ABSTRACT

A shareable utility that provides quality information to users in a given subject area. The utility maintains a quality database of information on the subject area on a local computing device. The quality database has links to objects of interest residing on the Internet and on the local device. All of the information in the quality database has been recommended for inclusion by an expert in the field. The present utility provides for dual searching of the local computing device and the Internet. A primary screen with multiple secondary windows is used as the starting point. The primary screen is designed to provide structure and direction to the search, but may also be customized to include a user/predefined template representing a broad level of interest. Subsequent display screens are used to display more detailed levels of interest in the given subject area. The present utility is well suited for applications in education, and knowledge transfer applications (e.g. specific code routines, best practices, lessons learned, etc.). The present utility architecture is highly adaptable, reusable and supports searches of all kinds (e.g. financial statements 2004, branch info, etc.). By aggregating expert knowledge (of "where" to look), other vendors search capabilities and the digitized resources available, one can leverage this utility to maximum advantage.

18 Claims, 7 Drawing Sheets

SHAREABILITY UTILITY

The present invention was originally disclosed in U.S. provisional patent application Ser. No. 60/614,448, filed on Sep. 29, 2004, and priority is claimed to the provisional patent application.

BACKGROUND OF THE INVENTION

The present invention relates generally to the fields of databases and search programs and more specifically to a computer program that maintains a quality database, allows dual searching of the local device and the Internet, and provides for easy navigation through different levels of specificity on any subject.

Databases are well known in the field. Databases typically use fields to store and organize large amounts of information. The stored information is then recalled by requesting the information in any one or more of the fields. Data mining is a process of retrieving information from one or more databases. Databases can store information in multiple forms including text, pictures, video, multimedia and any mime.

Multimedia is the presentation of information using the combination of text, sound, pictures, animation, and video. Multimedia applications can include predefined associations, known as hyperlinks, that enable users to switch between media elements and topics. Thoughtfully presented multimedia can enhance the learning experience for the end user and make the completion of required tasks much more simple. Multimedia documents found on the World Wide Web are called Web pages. Linking information together with hyperlinks is accomplished by special computer programs or computer languages. The computer language commonly used to create Web pages is called HyperText Markup Language (HTML).

A personal-computing device, such as a personal computer, a Macintosh® computer, and a handheld computer, includes a display screen, a keyboard and a pointing device, such as a mouse or pen, so that the user can direct the associations between hyperlinks and webpages. Photographs, drawings, and other still images must be changed into a format that the computer can manipulate and display. Such formats include bit-mapped graphics and vector graphics. Bit-mapped graphics store, manipulate, and represent images as rows and columns of tiny dots. In a bit-mapped graphic, each dot has a precise location described by its row and column, much like each house in a city has a precise address. Some of the most common bit-mapped graphics formats are called Graphical Interchange Format (GIF), Tagged Image File Format (TIFF), and Windows Bitmap (BMP). Vector graphics use mathematical formulas to recreate the original image. In a vector graphic, the dots are not defined by a row-and-column address, rather they are defined by their spatial relationships to one another. Because their dot components are not restricted to a particular row and column, vector graphics can reproduce images more easily and thus provide better output on most video screens and printers. Common vector graphics formats are Encapsulated Postscript (EPS), Windows Metafile Format (WMF), Hewlett-Packard Graphics Language (HPGL), and Macintosh graphics file format (PICT).

Video files can be quite large, so they are usually reduced in size using compression, a technique that identifies a recurring set of information, such as one hundred black dots in a row, and replaces it with a single piece of information to save space in the computer's storage systems. Common video compression formats are Audio Video Interleave (AVI), Quicktime, and Motion Picture Experts Group (MPEG or MPEG2). These formats can shrink video files by as much as 95 percent however, they may introduce varying degrees of distortion also. Animation can also be included in multimedia applications to add motion to images. Animations are particularly useful to simulate real-world situations, such as the flight of an airplane or a surgical procedure. Animation can also enhance existing graphics and video elements adding special effects such as morphing, the blending of one image seamlessly into another.

Sound, like visual elements, must be recorded and formatted so the computer can understand and use it in presentations. Two common types of audio format are Waveform (WAV) and Musical Instrument Digital Interface (MIDI). WAV files store actual sounds, much as music CDs and tapes do. WAV files can be large and may require compression. MIDI files do not store the actual sounds, but rather instructions that enable devices called synthesizers to reproduce the sounds or music. MIDI files are much smaller than WAV files, but the quality of the sound reproduction is not nearly as good.

Scroll bars, usually located on the side of the computer screen, enable the user to move to another portion of a large document or picture. Hyperlinks creatively connect the different elements of a multimedia presentation using colored or underlined text or a small picture, called an icon, on which the user points the cursor and clicks on a mouse. Multimedia has had an enormous impact on education. For example, medical schools use multimedia-simulated operations that enable prospective surgeons to perform operations on a computer-generated "virtual" patient. Similarly, students in engineering schools use interactive multimedia presentations of circuit designs to learn the basics of electronics and to immediately implement, test, and manipulate the circuits they design on a computer.

A modem, which stands for modulator-demodulator, is a device that connects a computer to a telephone line and allows information to be transmitted to or received from another computer. Computers that send and receive information to and from a network must include some communications hardware such as a telephone modem, a cable modem, or a network card. In the case of a telephone modem, the information sent from one computer is converted into an audio signal, which is then transmitted by telephone lines to the receiving modem, which converts the signal into information that the receiving computer can understand. Handshaking is the term used for the signal acknowledging that communication or the transfer of information can take place. Handshaking between computers can be controlled by either hardware or software.

The Internet is based on the concept of a client-server relationship between computers, also called a client/server architecture. To access information on the Internet, a user must first log on, or connect, to the client computer's host network. This connection can be established with or without user intervention depending on the software. Once a connection has been established, the user may request information from a remote server. If the information requested by the user resides on one of the computers on the host network, that information is quickly retrieved and sent to the user's terminal. If the information requested by the user is on a server that does not belong to the host LAN, then the host network connects to other networks until it makes a connection with the network containing the requested server. In the process of connecting to other networks, the host may need to access a router, a device that determines the best connection path between networks and helps networks to make connections. Once the client computer makes a connection with the server containing the requested information, the server sends the information to the client in the form of a file. A special computer program called a browser enables the user to view the file. Examples of Internet browsers are Mosaic, Netscape, and Internet Explorer. Non-multimedia documents do not need browsers to view their text-only contents and many multimedia documents provide access to text-only versions of their files. The process of retrieving files from a remote server to the user's terminal is called downloading.

Traditional search engines such as the above Internet browsers return thousands of results, or "hits", upon the completion of a search, and most of the hits presented to the user are only loosely related to the searched terms. The end result is a large number of electronic files and webpages that the user must sift through in order to find the information that he wants. Another shortcoming of traditional search engines is that they do not support different levels of interest on a given subject. Everything on the searched topic is dumped on the user all at once without regard to broad coverage or specific coverage on the searched topic. Further, the source of the information presented to the user is not always clear. Leading to doubts on the user's part as to whether or not the information is reliable.

What is needed in the field is a search approach that delivers quality results and requires less time and effort than traditional search engines. The ideal search utility would present a selected subject to the user in increasing levels of specificity and allow for easy navigation between the different levels. The ideal search utility would also store and provide information from experts in the field of the searched subject to the user. Users could also be provided with the source of the quality information.

SUMMARY OF THE INVENTION

A computer program capable of being executed on a local computing device, wherein the program includes a quality database on a given subject and allows a user to simultaneously search the local computing device and the Internet. The program is designed to produce a small number of useful results rather than large numbers of loosely related results. The program includes a communications module, at least one quality database, a graphical user interface and an operating system. The communications module provides for the transfer of information to and from the Internet. The quality database contains information, including pointers, regarding a specific subject and all of the information in the quality database is provided or recommended by an expert in the field. The information/pointers from the experts includes the experts own suggestions/publications and related website addresses, text files, image files, HTML documents and any mime code. The graphical user interface module initially provides a primary screen to the user that includes keywords and specific topics intended to provide some direction and structure to the search. In response to the user's selection, the interface module causes a dual search of the device storing the quality database and the Internet to be performed, and displays the results in a secondary screen. The operating system controls communications between the graphical user interface module, the communications module and the quality database.

Each secondary screen includes multiple windows. The first secondary window is a search input window that accepts input, including terms to be searched, from the user. The second secondary window displays "hits" from within the local device. The third secondary window displays "hits" from the Internet.

The initial primary screen may optionally include a user/predefined template, including words, images and concepts, that defines a broad level of interest in a subject area. When the user clicks one of the hyperlinks in the template, a secondary screen is used to present a more detailed level of interest on the subject area to the user. Subsequent secondary screens presented to the user provide even more detailed levels of interest on the subject area. The template can be associated with a group of users, with each user having access to all of the search and display screens previously viewed by users of the group. The subject area of a template can be a subject that is of interest to each user in the group, such as a family tree or a common project.

It is an object of the present invention to provide a quality database on a subject, wherein all of the information in the database has been deemed to be of some value by an expert in the field.

It is another object to provide an efficient way to include the quality database in an Internet search.

It is still another object of the present invention to maintain an expandable library of quality databases and allow dual searching of a local device and the Internet.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
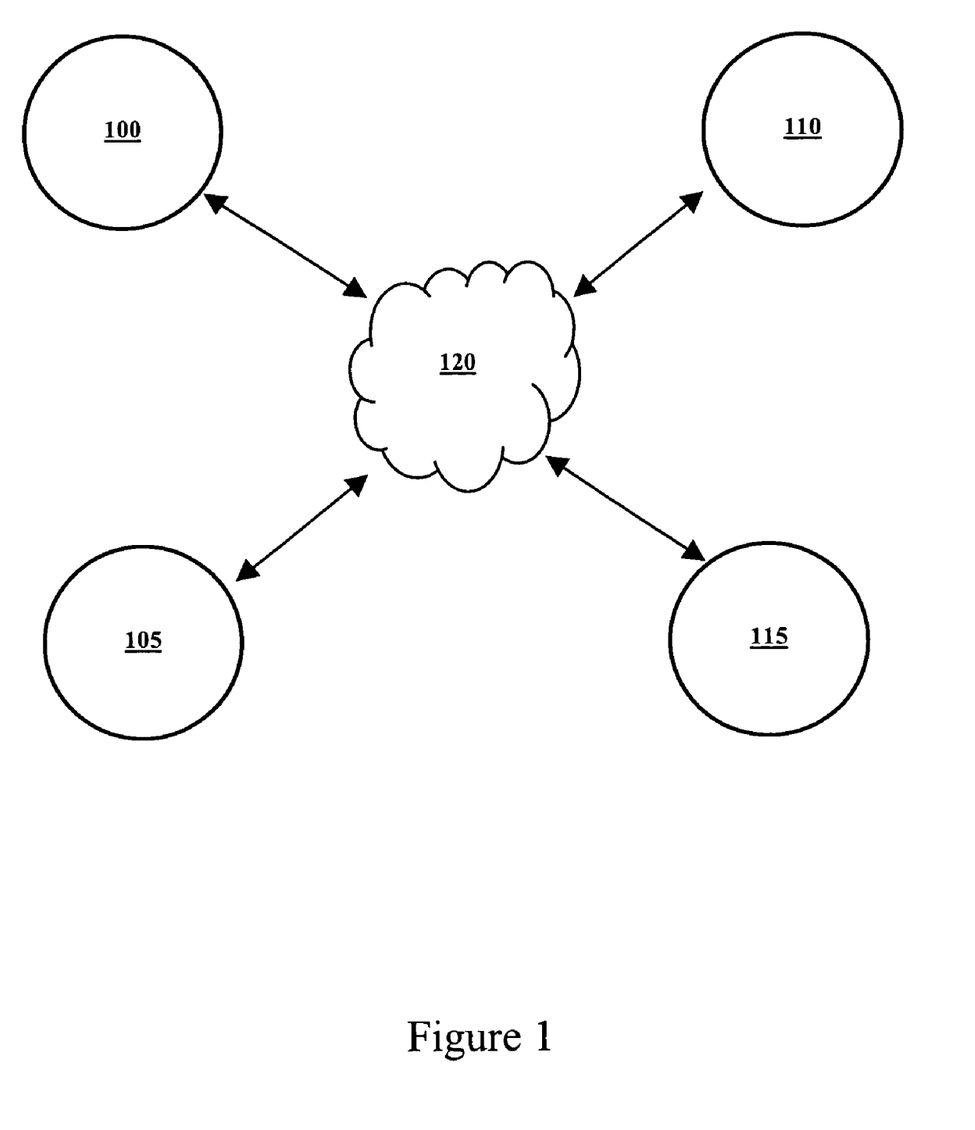
FIG. 1 is a conceptual communications diagram for the present invention.

Referring to FIG. 1, the present shareability utility can be stored and executed on virtually any computer 100, including a personal computer and a Macintosh® computer. The present utility may also be stored and executed on a server 105 and accessed over any network 120 by computer 100, a personal digital assistant 110 or other digital devices 115, including cellular telephones.

Figure 2:
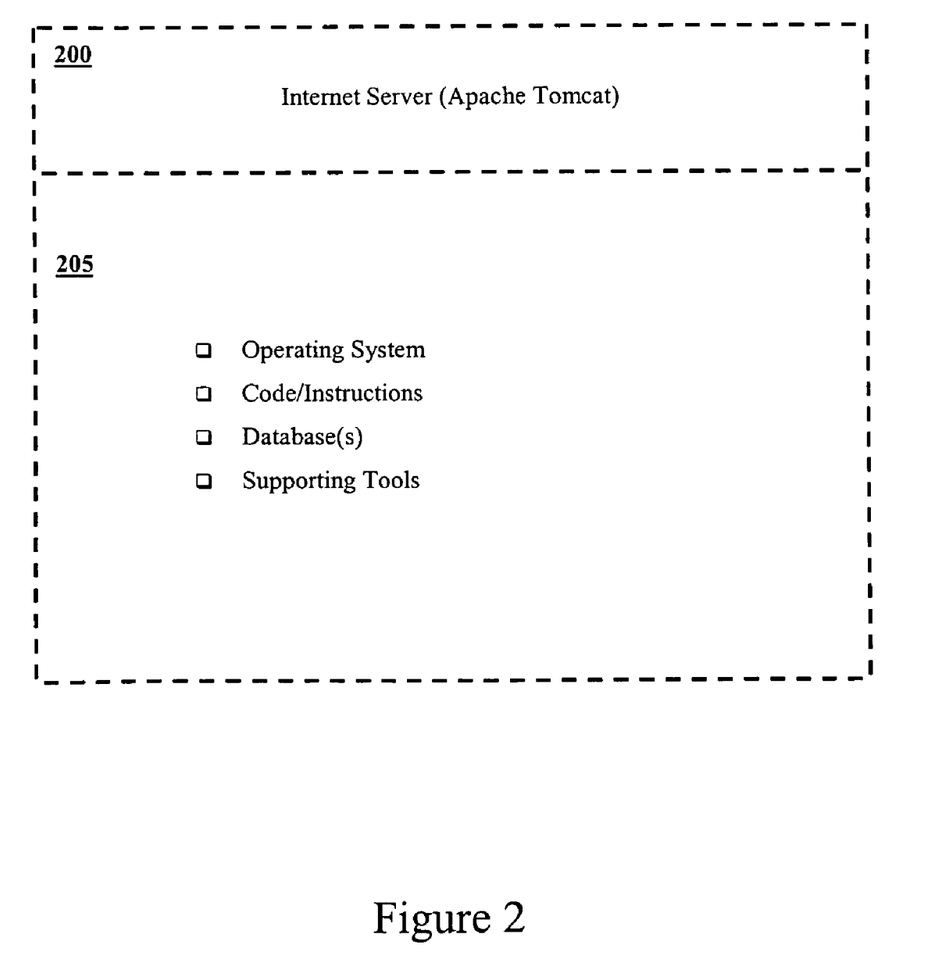
FIG. 2 is an internal view of the preferred embodiment of the present shareability utility.

FIG. 2 shows an internal view of programs and other software used in the preferred embodiment of the present utility. It is the intention to use open standards wherever possible especially if that minimizes costs and/or increases the potential marketplace. The preferred Internet server program 200 is Apache Tomcat. The Internet server program 200 handles all communications to and from the Internet. The other preferred programs 205 include an operating system; at least one quality Database, which is a key aspect of the present invention; Supporting tools for searching, linking and other capabilities; and, other computer Code and Instructions for storing data, executing searches and presenting quality information to the user.

The quality database is stocked pointers and hyperlinks to quality information on a given subject and, in the preferred embodiment, all of the quality information linked to the quality database is provided or recommended by an expert in the field. For example, all of the information/links stored in the Management Theory quality database has been obtained from, or provided by, experts in the field of Management Theory. Further, information/links stored in the quality database on the subject of Finance has been obtained from, or provided by, experts in the field of Finance. The term "expert" is being used here in its traditional meaning and is intended to refer to a person that either through professional training or personal experience has acquired a mastery of a specific subject (e.g. e-commerce, project management, etc.).

Figure 3:
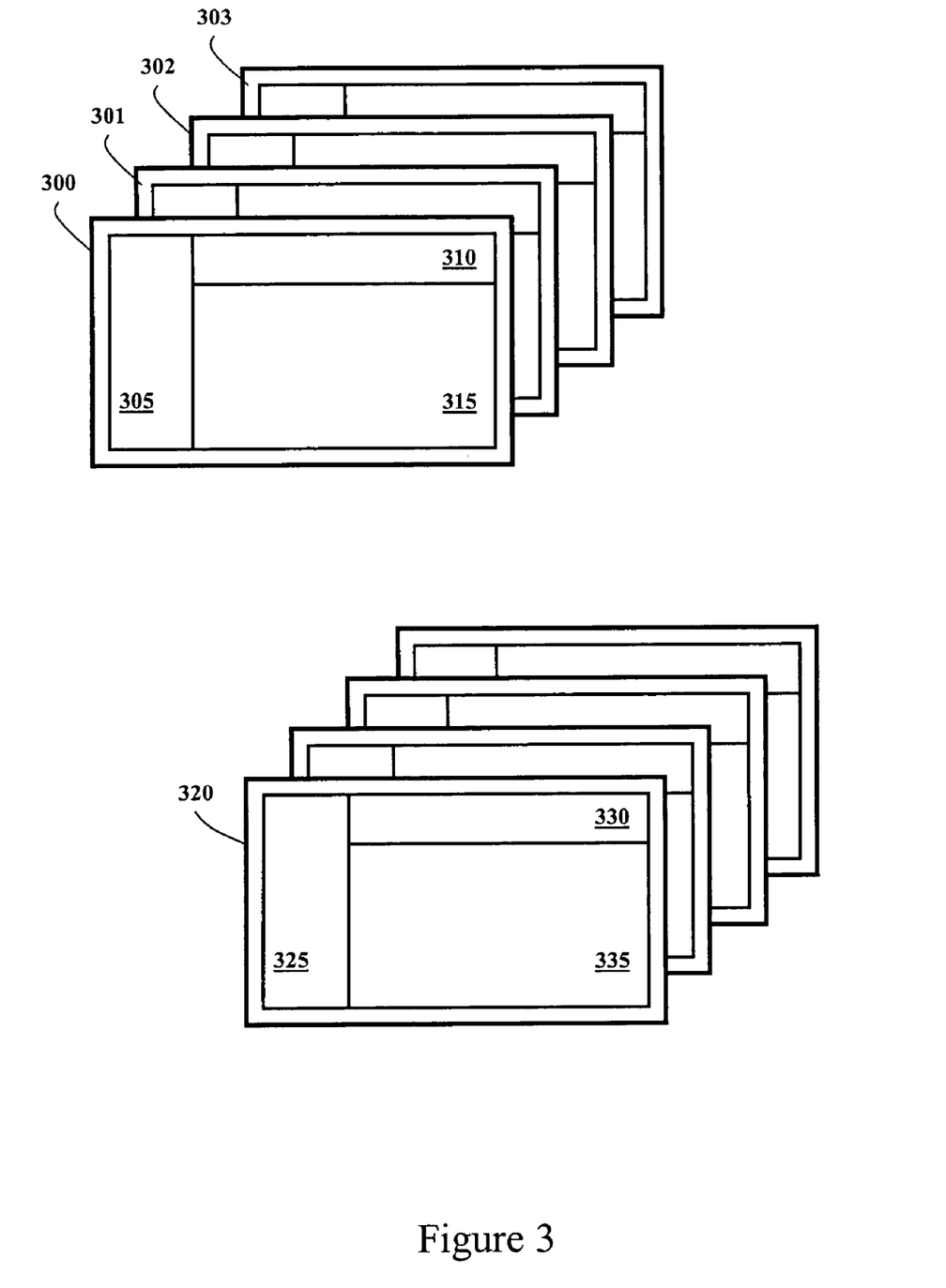
FIG. 3 shows an exemplary user interface of the present utility.

FIG. 3 shows the preferred user interface of the present "Shareability Utility", wherein two searches, using two quality databases, has been performed. The first search was initiated from primary screen 300, with the results being displayed in secondary screens 301-303. The second search was initiated from primary screen 320, with the results being displayed in the secondary screens behind screen 320. The primary screens 300 & 320 are intended to provide structure and direction for initial searches. In the preferred embodiment, windows 310 & 330 in the two primary screens display the subject of the quality database. Windows 315 & 335 in the primary screens display a first type of hyperlinks to the user. Windows 305 & 325 in the primary screens display a second type of hyperlink to the user. The hyperlinks all of the windows in the primary screens 300 & 320 work in the same manner as traditional hyperlinks. However, the way the links are presented to user is different. The first type of hyperlink may be presented as specific topics within the subject, while the second type of hyperlink can be presented as well known authors, Internet sites or other objects of interest on the subject. Alternatively, the first type of hyperlink may be presented as keywords within the subject, while the second type of hyperlink is presented as thumbnail pictures or other illustrations relating to the subject. An FTP (file transfer protocol) button may also be provided for the transfer of documents.

Figure 4:
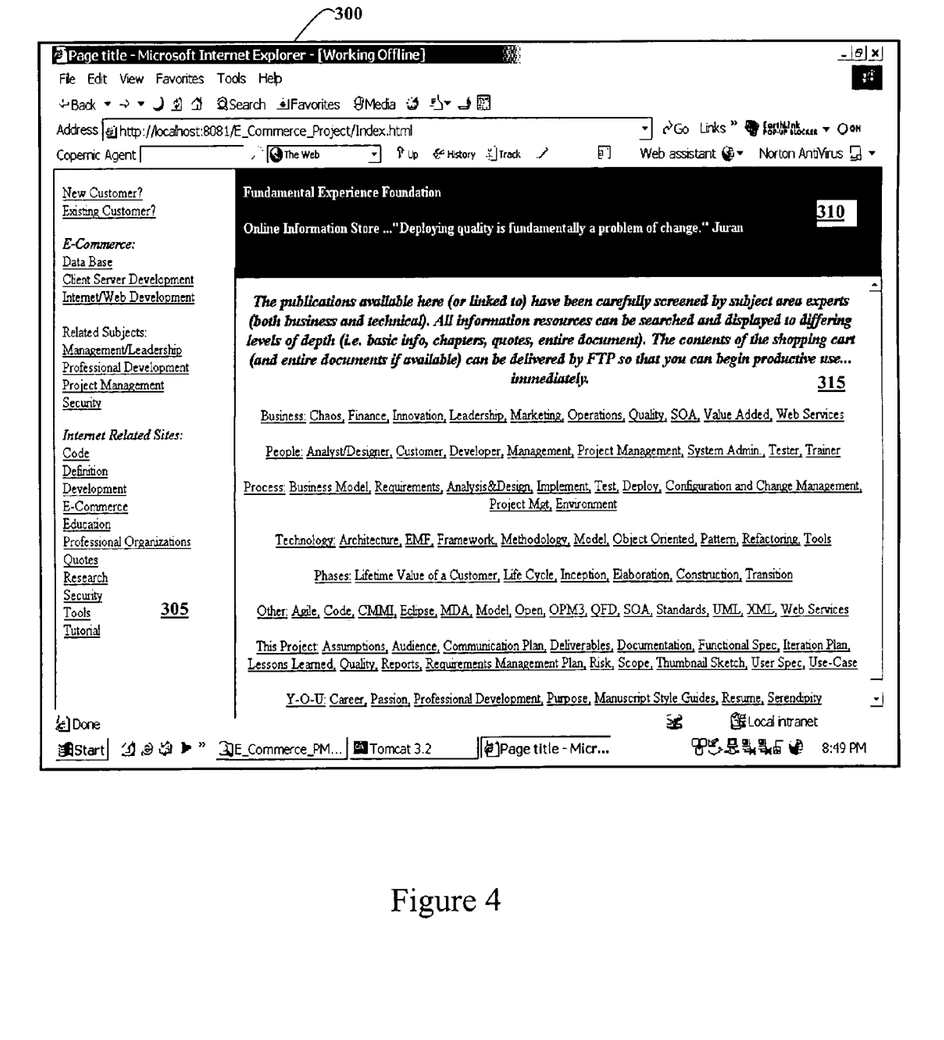
FIG. 4 shows an exemplary primary screen.

FIG. 4 shows an exemplary primary screen 300. Screen 300 is similar to an Internet browser in the preferred embodiment. Window 310 provides a subject of the quality database being used and windows 305 & 315 provide selected hyperlinks that provide structure and direction to a search. Window 315 provides hyperlinks to selected broad topics within the subject area of Management, including Business, People, Process and Technology. Hyperlinks are also provided to more specific topics within each broad topic, in window 315. For instance, under the broad topic of Business, in window 315, are provided links to specific topics, including Chaos, Finance, Innovation, Leadership and Marketing. Following, or "clicking" on, any of the links in window 315 will lead the user to information/pointers on the selected topic that has been deemed important by an expert in the field. By integrating the present quality database with the search program, the user is able to find higher quality results in less time and requiring significantly less effort/research. The number of subjects that are good candidates for creation of a quality database is large and the applicability of the present invention is extremely wide. Other areas within the primary screen provide traditional browser functions, including an address bar for surfing the Internet, input windows for accepting input from the user, and icons for other search and display screens that have been minimized. If the user chooses to perform a search on a subject, the present utility searches both the Internet and the local device, which includes the quality database, for pertinent information and displays "hits" both from the Internet and the local device to the user in a secondary screen. Thus the user is always able to view and make more selections from the primary screen, which contains the broadest topics on the subject. The quality database has links to objects of interest residing on the Internet and/or the local/remote device.

Figure 5:
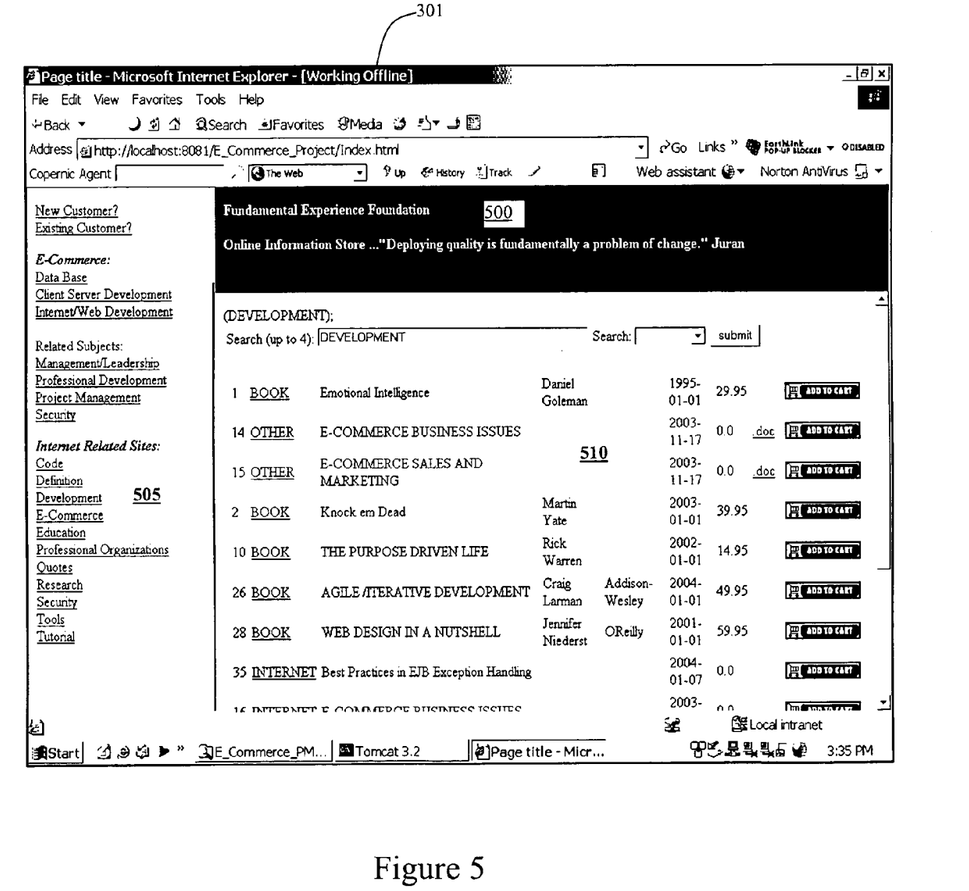
FIG. 5 shows an exemplary secondary screen.

FIG. 5 shows an exemplary secondary screen 301 that is displayed to the user after selection of one of the topics shown in a primary screen. Secondary screens differ from primary screens in that user's can provide their own search input in secondary screens. Secondary screen 301 includes windows 500, 505 & 510. Window 500 is the subject window and preferably displays the same subject as is displayed in the primary screen. In this example, window 510 displays multiple hyperlinks or pointers to information related to the search subject. Most of the hyperlinks in window 510 are to books or documents within the local device. The hyperlink shown as INTERNET is a link to a website on the Internet. Window 505 provides hyperlinks to related subjects. In the preferred embodiment, the primary and secondary screens, or graphical user interface, are similar to a traditional Internet browser in that the present screens include the same functionality as traditional Internet browsers.

The present "Shareability Utility" evolved from an e-commerce development project. The "Shareability Utility" itself could be very helpful in the education arena wherein, educators can have their students follow along as they go from broad coverage of a subject area to detailed coverage of specific topics within the subject area. For instance, a teacher covering an e-commerce development course on the computer language JAVA® can start with a display screen that lists broad topics such as history and popular applications. The teacher can then move to a tutorial screen that shows the students how to write a sample JAVA® program. The teacher can later jump to a display screen that shows the raw code used in the JAVA® program. The present "Shareability Utility" provides incremental degrees of specificity on many topics and by using multiple screens, the users are always able to return to previous screens and make other selections. In fact the "Shareability Utility" search capability was itself used to make the documentation easily available for all elements that it uses to function properly (e.g. database information, HTML, JavaScript, JSP, Java, etc.). Thus a student could effectively disect and examine the parts as well as observe the functioning whole! Useful tutorials, tools, code, e-commerce articles, functional spec, deliverables, etc. are also stored (see "Internet Related Sites" and "This Project" key words).

Figure 6:
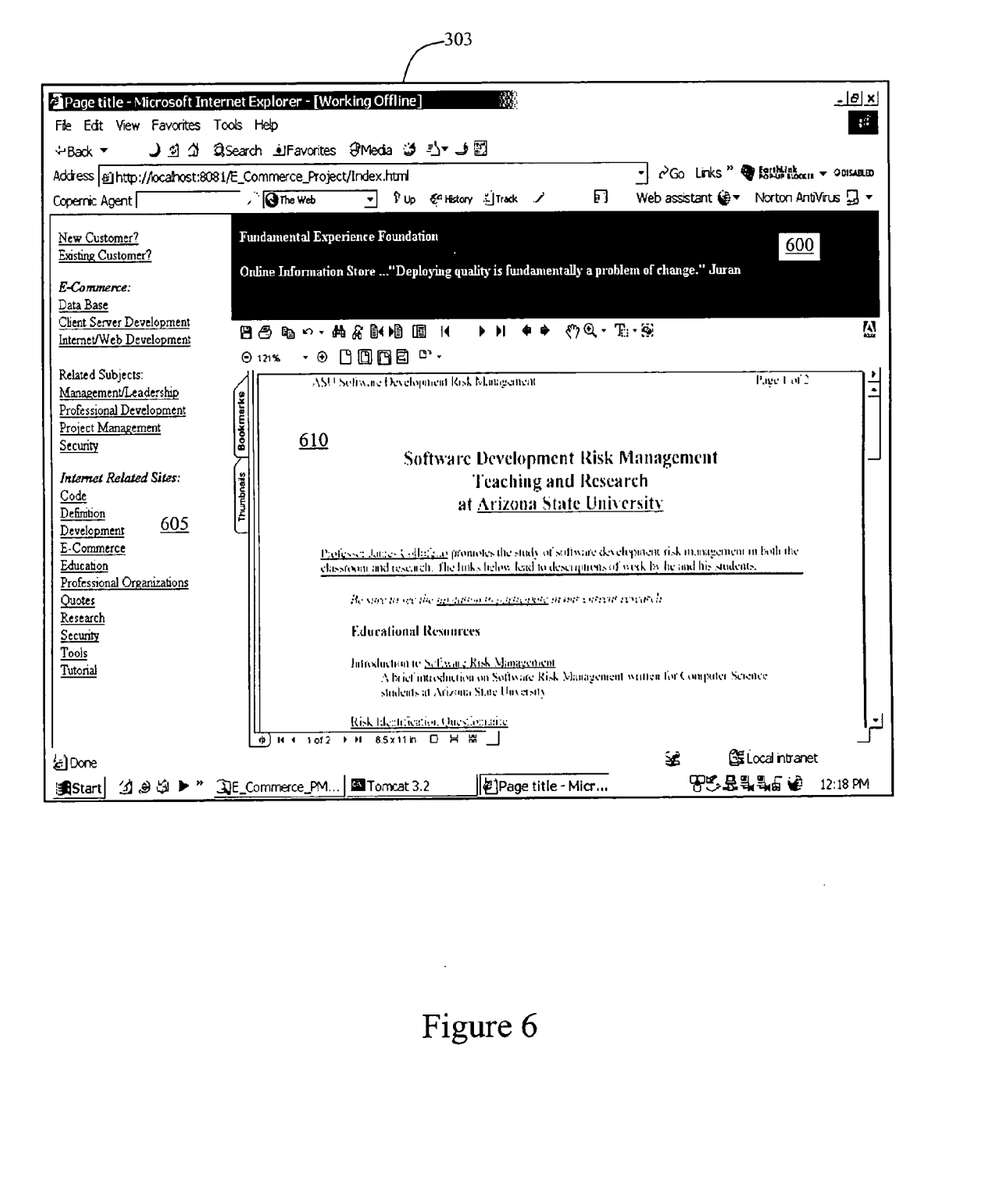
FIG. 6 shows an exemplary final destination screen.

FIG. 6 shows an exemplary final destination screen 303. In this example, the user has followed a structured search to find his desired document, which is displayed in window 610. Screen 303 also includes a "subject" window 600 and a related topics window 605.

Figure 7:
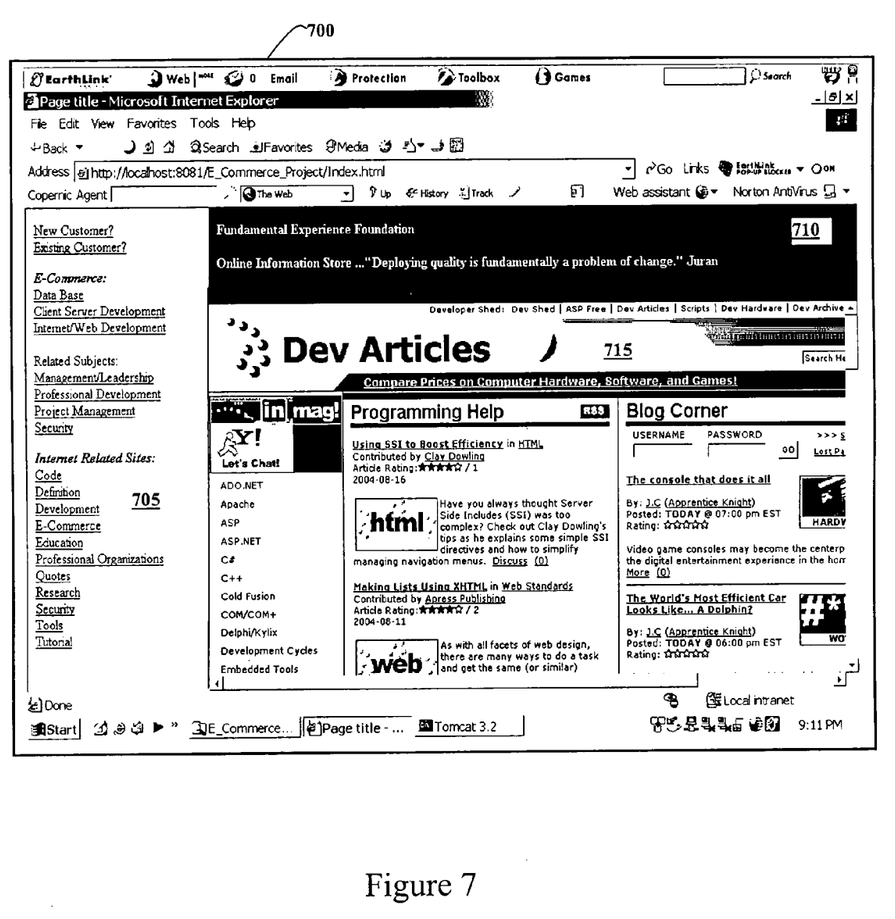
FIG. 7 shows another exemplary final destination screen.

FIG. 7 shows another exemplary final destination screen 700. In this example, the user has followed his directed search and found his desired website, which is displayed in window 715. Screen 700 also includes a "subject" window 710 and a related topics window 705.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A computer program being executed on a local computing device, the computer program comprising:
   at least one quality database devoted to a particular subject matter residing on the local computing device that includes information provided by a user who is an expert in a field, said information comprising the expert's own suggestions, publications and related website addresses, text files, HTML documents and any mime code, and said information being organized in a way that allows cross-type searching by keyword regardless of data structure;

a communications module that allows remote users to search and access information on the local quality database;

a graphical user interface that provides a primary screen and multiple secondary screens to the user, wherein the primary screen presents at least two types of links, internal and external, to the user that provide structure and direction for an initial search in the subject area, and a first secondary screen that presents hits to the user based on a selection made by the user in the primary screen, wherein internal links provide paths to sources on the local computing device and external links provide paths to sources on the other quality databases; wherein a pre-defined secondary screens previously viewed by users in the group; wherein the multiple secondary screens are capable of accepting input from the user and performing a further in-depth search, in response to the selection made by the user in the primary screen, the interface module causes a dual search of the local computing device and the other quality databases via the network to be performed; and wherein each database that is remote to the user is stored on a local computer and is populated and organized with quality information that has been recommended as relevant to the database's subject matter by a user who is an expert in the field; and an operating system that controls communications between the graphical user interface module, the communications module and the quality database, wherein the operating system facilitates sharing of information between the user of the quality database and the other users of the other quality databases.

2. The program of claim 1, wherein the primary screen includes multiple windows, and wherein a first window displays one or more internal links and a second window displays one or more external links to the user.

3. The program of claim 2, further comprising a registration process for all users, wherein all information is designated as shared, not-shared or semi-shared during the registration process, and wherein approval from an authoring user is required in order to access semi-shared information.

4. The program of claim 1, further comprising the ability to search while not connected to the network, wherein the user interface displays results from the quality databases for the user's selection.

5. The program of claim 1, wherein the operating system is an open standards operating system, and wherein the network is a LAN, an intranet or the internet.

6. The program of claim 1, wherein when the user clicks on a link to a website, the website is displayed in a secondary screen, and all functions of the website are available to the user just as if the user had accessed the website directly from a traditional browser program.

7. The program of claim 1, wherein the primary and secondary screens include traditional browser programs, comprising controls for screen size, scroll bars and at least one menu bar with multiple functions.

8. The program of claim 1, wherein the database includes a source field for recording a source of the provided information.

9. The program of claim 1, wherein the local computing device is connected to a network and the program is accessed and executed on a remote digital device including, a laptop computer, a desktop computer, a palm computer and a cellular telephone.

10. The program of claim 1, wherein the program is stored on a server and executed on a remote digital device including, a laptop computer, a desktop computer, a palm computer and a cellular telephone.

11. The program of claim 1, wherein secondary screens that are presented to the user subsequent to the first secondary screen provide even more detailed levels of interest on the selected subject area.

12. The program of claim 1, wherein the selected subject area of the template is a subject area that is of interest to each user in the group, including a common project.

13. The method of claim 1 wherein non-expert users may access the subject matter databases described in claim 1 using a graphical user interface.

14. A computer-implemented method for searching information, the method comprising:

enabling an expert in a specific field of study ("Field A") to compile a local database devoted to information related to Field A, said information comprising the expert's own suggestions, publications and related website addresses, text files, HTML documents and any mime code, and organize it in a way that allows ranking of the information by the expert, regardless of the information's data structure, and containing only information that the expert deems to be relevant to Field A;

enabling one or more other experts in other fields of study ("Fields B & C") to compile their own similar local databases and having those other experts organize their databases in a similar manner to the database for Field A, but the databases being instead devoted to Fields B & C;

allowing each of the experts to search both their local database using a graphical user interface as well as the remote databases being maintained by the other experts;

systematically networking a potentially unlimited number of experts and leveraging each of their expertise to organize and rank information into subject matter databases capable of being searched using a graphical user interface by other users of the network; and wherein the graphical user interface includes a pre-defined template that is associated with a group of users, and each user in the group having access to secondary screens previously viewed by users in the group.

15. A computer program product comprising a computer-readable medium containing computer program code for performing a method, said method comprising:

enabling a subject matter expert, upon reviewing a relevant piece of information, said information comprising the expert's own suggestions, publications and related website addresses, text files, HTML documents and any mime code, to rank the item for relevance and importance to a particular field of study;

allowing the compilation of a subject matter specific database based on the a ranking or tag given by the expert through the computer program product;

allowing the database to be searched locally by the expert user using a graphical user interface;

allowing other remote databases created, using the same computer program product, by other experts in differing fields to be searched using a graphical user interface; and allowing remote users of the same computer program product to search any of the databases using a graphical user interface; and wherein the graphical user interface includes a pre-defined template that is associated with a group of users, each user in the group having access to secondary screens previously viewed by users in the group.

16. The program of claim 15, wherein a first window displays one or more internal links and a second window displays one or more external links to the user.

17. The program of claim 15, further comprising the ability to search while not connected to the network, wherein the user interface displays results from the quality databases for the user's selection.

18. The program of claim 15, wherein the local computing device is connected to a network and the program is accessed and executed on a remote digital device.

* * * * *